United States Patent [19]

Svensson et al.

[11] 4,161,228

[45] Jul. 17, 1979

[54] VEHICLE CRASH DETECTOR

[75] Inventors: Lars G. Svensson, Upsala; Gustav Karlstedt, Sollentuna; Claes Tisell, Strangnas; Yngve Thorstensson, Sollentuna, all of Sweden

[73] Assignee: Forenade Fabriksverken, Sweden

[21] Appl. No.: 865,216

[22] Filed: Dec. 28, 1977

[30] Foreign Application Priority Data

Jan. 13, 1977 [SE] Sweden .................................. 7700327

[51] Int. Cl.² ...................... G05G 15/00; G05G 15/02; G05G 15/04
[52] U.S. Cl. .................................. 180/282; 200/61.53; 280/734
[58] Field of Search .................... 180/103 A; 280/734, 280/735; 200/61.53

[56] References Cited

U.S. PATENT DOCUMENTS

| 3,018,664 | 1/1962 | Humble | 200/61.53 |
| 3,217,121 | 11/1965 | Hradek et al. | 200/61.53 |
| 3,509,299 | 4/1970 | Lawrie et al. | 200/61.53 |
| 3,662,606 | 5/1972 | Prachar | 73/514 |
| 3,859,483 | 1/1975 | Laserson et al. | 200/61.53 X |

Primary Examiner—Albert J. Makay
Assistant Examiner—Edmond G. Rishell, Jr.
Attorney, Agent, or Firm—Larson, Taylor and Hinds

[57] ABSTRACT

A crash detector is provided for controlling actuation of an actuator such as a release mechanism for seat belts, an air bag or the like. A main body such as a ball is located in a bore in a housing and retained by a first, relatively weak spring. A firing pin having a portion for actuating the actuator is axially movable in the housing bore. A second spring biases the firing pin towards an inoperative position. The firing pin is moved to an actuating position when the deceleration force acting on the vehicle, and hence the mass body, exceeds a predetermined magnitude.

13 Claims, 2 Drawing Figures

VEHICLE CRASH DETECTOR

BACKGROUND OF THE INVENTION

The present invention relates to a crash detector of the type which at strong retardation gives an indication that an accident, for instance a crash has just started and which thereby releases a safety means intended to reduce the effect of said crash. Detectors of this kind can be used in many different fields, and a fertile field of use is in motor vehicles, in which the crash detector at retardation over a predetermined limit can for instance release a means for tightening safety belts or car belts, provide an inflation of gas-filled damp cushions, release a fire extinguish means, start an alarm signal etc.

Crash detectors are previously known which comprise an inertia body, which is mounted in a cylinder or similar casing and which in the normal position is maintained in a position spaced from the said releaser means for instance by means of a spring or any other retaining means which in case of strong retardation brakes and releases the inertia body to allow said body to move towards the releaser means. The said crash detectors are disadvantageous in that it is very difficult to calculate the holder force for the spring or the retainer means so that unintentional release of the detector is prevented for instance at strong braking, unevenesses in the road or such small crashes which may occur when parking the vehicle etc. If on the other hand the holder force is too strong there is a risk that the crash damping means will never be released.

Some other types of crash detectors which likewise comprise an inertia body which is kept in a restored position by a spring is disadvantageous in that the holder spring must be very strong to eliminate the risk for release in case of strong braking, unevenesses in the road or when parking crashes occur, and this may have as an effect that the release of the safety means or crash damping means follows too late.

BRIEF SUMMARY OF THE INVENTION

The present invention therefore relates to a crash detector which should be mounted adjacent the front end of the car and which is designed so that release is obtained at the least possible delay and so that the safety means is thereby actuated in time to give the best possible protection.

It is of importance that a crash detector is designed so as not to release at retardation depending on strong braking, unevenesses in the road or minor parking crashes.

According to the invention an embodiment of the crash detector comprises a closed chamber for instance a closed cylinder which is stationary mounted preferably in the moving direction of the means, for instance the vehicle to be supervised, and the said cylinder contains a mass body in the form of a ball which is retained spaced from the releaser means by a soft spring, and the cylinder includes at the releaser end a releaser pin, which is kept in a retracted position from the means to be released by a strong spring and in which the releaser pin is mounted inside the said relatively soft ball spring so that the release follows in that the ball compresses both the relatively soft spring and the strong spring of the releaser pin.

BRIEF DESCRIPTION OF THE DRAWINGS

Further characteristics of the invention will be evident from the following detailed specification in which two embodiments of the invention will be explained with reference to the accompanying drawings.

DETAILED DESCRIPTION

Figure 1:
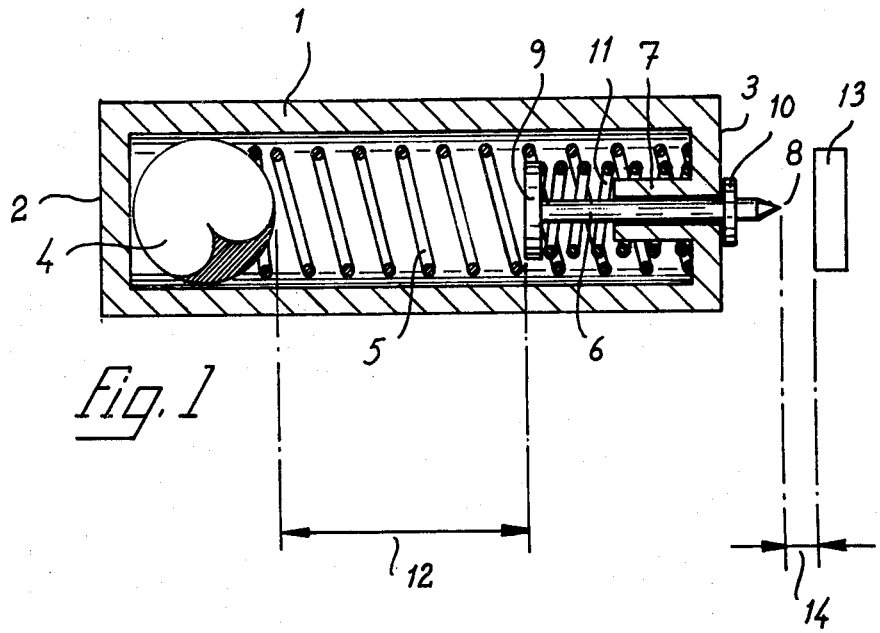
FIG. 1 is a cross sectional view of a crash detector in accordance with a first embodiment of the invention.

The apparatus shown in FIG. 1 comprises a closed housing which is preferably formed as a cylinder which is intended to be mounted stationary at the means, for instance the motor vehicle to be supervised. At the rear end 2 the cylinder 1 is closed and at the front end 3 the cylinder is partially closed. The cylinder may have any suitable cross section form but preferably it is formed with a circular cross section area and it encloses a mass body 4 of a predetermined weight, which body may preferably be a ball. The mass body may however alternatively be a cylinder, a cube or similar, but a ball is preferable since it can move within the cylinder with optimum low friction. Normally the ball 4 is kept pressed to the rear end 2 of the cylinder by means of a coil spring 5 which with one end engages the front end 3 of the cylinder and with the opposite end engages the ball 4. The coil spring 5 is relatively soft i.e., has a relatively low spring constant, but it has to be strong enough to prevent a movement of the ball 4 within the cylinder 1 at such retardation which occurs at strong braking of the vehicle or when driving on uneven roads. At the front end 3 the cylinder 1 carries a pin, i.e., a firing pin 6, which is axially movably mounted in a sleeve 7 at the said front end 3 of the cylinder. The pin 6 is formed with a rear head 9 which provides the hit point for the ball within the cylinder, and it is formed with a collar 10 at the outside of the cylinder end 3. The pin 6 is long enough to be able to move some distance in the sleeve 7 and it is normally held in a retracted position by a strong coil spring 11, i.e., a spring having a higher spring constant than that of spring 5, mounted round the sleeve 7 and with one end engaging the front cylinder wall 3 and with the opposite end engaging the head 9 of the pin 6. The pin head 9 is provided within the relatively soft ball retainer spring 5 so that the pin 6 can be moved against the action of the strong spring 11 and independently of the ball retainer spring 5. The cylinder 1 is long enough to allow the ball 4 to move some distance within the cylinder without actuating the pin 6. The free distance 12 between the ball 4 and the pin head 9 is calculated considering the course of acceleration for which the detector is expected to be subjected. Normally the distance 12 is so large that the ball reaches its maximum speed in relation to the cylinder 1 before it reaches the pin 6 during the ball movement.

It is of importance that the ball retainer spring is so soft that the ball 4 without a too strong counter action can move within the cylinder at the first phase of a crash and the reason for this is to allow the mass body provided by the ball to be accelerated to a particular speed at said first phase and that the kinetic energy thereby obtained shall be sufficient for the ball to force the pin 6 out of the cylinder a distance 14 against the action of the strong spring 11, whereupon the pin in turn provides a release of a safety means or any other means to reduce the effect of the crash. At too low kinetic energy the ball is only capable of pressing the pin 6 a distance which is less than the distance 14 and no release is obtained. Thus the ball 4 is to be kept in its retracted position by a particular threshold pressure and the said threshold pressure may be changed depending on the circumstances. To provide a release of the said safety function or the crash damping action a releaser means or actuator 13 is stationary mounted in the vehicle spaced from the point 8 of the pin 6 when in its retracted position. The distance 14 between the pin point 8 and the releaser means 13 likewise may be changed depending on the strength of the ball retainer spring 5 and especially the pin retainer spring 11 so that the releaser means 13 is not unintentionally actuated in case of violent brakings or small crashes when a release is not considered necessary. The releaser means 13 can be an electric, mechanic, pneumatic, hydraulic or other means which by an instantaneous action provides an extra tightening of the safety belts, an inflation of shock damping cushions, a release of fire extinguishers, an alarm signal or any combination of the said functions.

The function of the apparatus is the following: At normal running of the vehicle the ball 4 is kept pressed to the rear end 2 of the cylinder by a relatively soft spring 5. If on the contrary a crash occurs and for this reason a retardation is unnormally strong the ball 4 begins to move within the cylinder depending on its kinetic energy and the ball gets an acceleration movement in relation to the cylinder 1. During a first predetermined phase thereof, the ball 4 is released by spring 5 only and is independent of spring 11. Generally the speed of the ball has reached its maximum before the ball 4 hits the head 9 of the pin 6 whereafter the combined action of the ball spring 5 and the pin spring 11, during a second, later phase, provides a braking of the ball at the same time as the pin 6 is pressed outwards from the cylinder. In case of a crash at low speed it can be supposed that the pin is pressed out a distance which is less than the distance 14 between the pin point 8 and the releaser means 13, but in case of a crash at high speed the pin 6 is pressed to the bottom so that the point 8 thereof hits the releaser means 13 and provides the intended release. The distance 14 is chosen as short as possible to provide a short release respite. As soon as the ball is braked to stop and the force depending on the ball acceleration is less than the counter acting force from the springs 5 and 11 the ball is moved back to its initial position at the rear end 2 of the cylinder. If the pin 6 unintentionally hits the releaser means 13 the crash detector according to the invention is not damaged and the detector is prepared for another function as soon as the ball has moved back to its initial position at the rear end 2 of the cylinder. From the foregoing it will be understood that the detector will normally actuate the actuator 13 when the deceleration force acting on the vehicle exceeds a predetermined magnitude. The vehicle will, of course, have leading and trailing ends which correspond to the leading and trailing ends of the bore of housing 1.

In another embodiment of the invention the retaining force from the pin spring 11 and the distance 14, which parts together define the releasing kinetic energy that the ball must have is replaced by another energy receiving apparatus.

Figure 2:
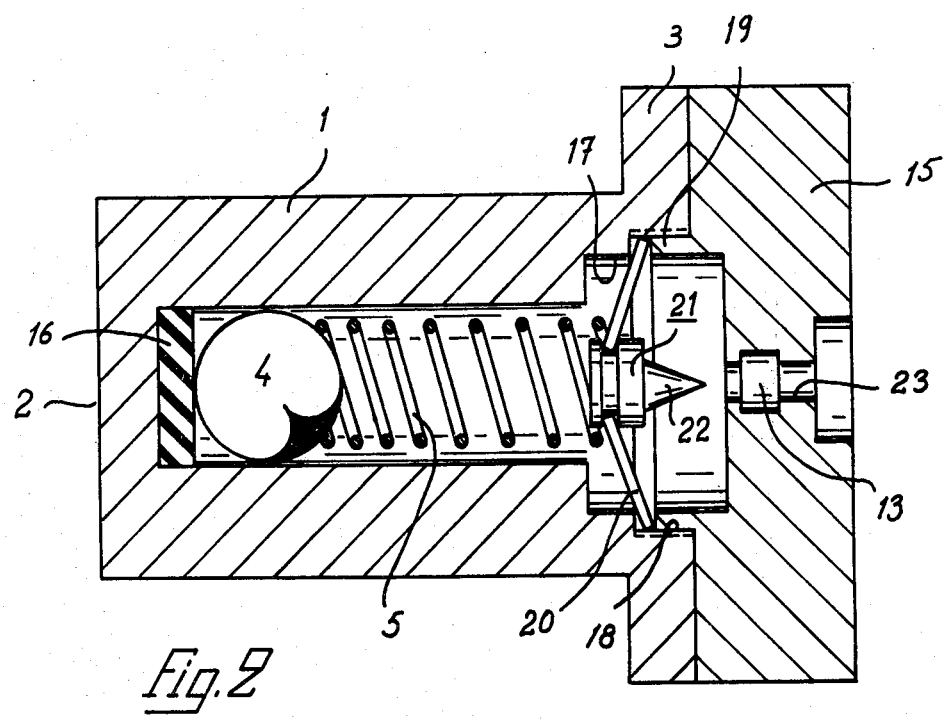
FIG. 2 is a cross sectional view of a crash detector in accordance with a second embodiment of the invention.

The alternative embodiment of the invention shown in FIG. 2 is likewise formed with a housing 1 which at the rear end 2 is closed and which at the front end 3 is directly connected to a carrier 15 for the releaser means 13 which in this case is a detonator, which in turn is intended to initiate the release of the intended function. Also in this embodiment a ball 4 is freely movable in the housing a limited distance against the action of a relatively soft spring 5 which tries to keep the ball in its rear position. At the bottom of the cylindric ball bore there is a dampening means 16 in the form of a pad of rubber or similar material which damps the movement of the ball when moving back to its rear position and which reduces the risk that the ball starts reciprocating in the cylinder bore.

At the front end the cylinder bore of the housing 1 is slightly widened in two successive steps 17 and 18 respectively and in the outer widened part 18 the carrier 15 is mounted for instance by a thread joint. The threaded portion 19 of the carrier 15 is shorter than the widened portion 18 of the housing thereby providing a groove between the said two parts in which a plate spring 20 of snap spring type is mounted. At the centre the plate spring or snap spring 20 carries a striking pin 21 having a point 22 which is directed out of the housing 1. The striking pin 21 is kept in a retracted prestressed position by the plate spring 20. The outer end of the relatively soft ball retainer spring 5 engages the plate spring 20 of the striking pin, which spring is relatively strong. Thereby the ball can move from its rear position shown in FIG. 2 to the rear end of the striking pin 21 without actuating the plate spring 20 to shift to its outer extreme position.

As mentioned above the releaser means 13 in this case is a detonator which is mounted in a central bore 23 of the carrier 15 in front of the point 22 of the striking pin 21 and at such distance from said point that the detonator is actuated by the striking pin point 22 when the plate spring 20 is pushed out and takes its front extreme position. This occurs when the ball 4 at a very beginning crash gets such kinetic energy that it is moved from its rear position and hits the striking pin with such force that the plate spring 20 snaps over to its front position. The detonator may in turn be adapted to actuate some means for providing the intended function.

It is obvious to the expert that the crash detector according to the invention can be designed as a combination of several different detectors and to provide an action also in case of side crashes a single or double acting crash detector may for instance be mounted in the transversal direction of the vehicle. Further modifications which are obvious to the expert in this field may be presented within the scope of the appended claims.

We claim:

1. Crash detector for actuating an actuator of an operating system of a movable vehicle when a deceleration force acting on the vehicle exceeds a predetermined magnitude, the vehicle being movable in a predetermined direction of movement and having leading and trailing ends, said crash detector comprising:

a longitudinally extending housing adapted to be mounted on the vehicle and defining a bore having leading and trailing ends facing in the same direction as the leading and trailing ends of the vehicle;

a mass body positioned in the rear end of the bore of said housing for axial movement towards the leading end in response to deceleration forces acting on the vehicle;

a first spring having a predetermined spring constant and exerting a force on said mass body urging the mass body towards said trailing end;

a firing pin axially movable in said bore and positioned in said bore between said mass body and said leading end of said bore and having a portion thereof adapted to actuate said actuator, said portion being spaced a predetermined distance from the actuator; and a second spring having a predetermined spring constant greater than the predetermined spring constant of the first spring and exerting a force on the firing pin urging the firing pin towards said trailing end, said mass body and said firing pin and said first and second springs being interrelated in such manner that when a deceleration force acting on the vehicle exceeds the predetermined magnitude, said mass body moves towards the leading end of the bore against the force of said first spring and contacts said firing pin and thereafter moves against the force of said first and second springs, said firing pin being moved said predetermined axial distance by said mass body and the deceleration force.

2. Crash detector according to claim 1, characterized in that both the springs are coil springs.

3. Crash detector according to claim 1, characterized in that the firing pin includes a head and a portion extending out of the housing, and in which the second spring engages the pin head thereby holding the firing pin in a retracted position.

4. Crash detector according to claim 3, characterized in that the head of the pin is provided inside the the first spring so that the mass body, during a predetermined phase, is movable inside the housing independently of the second spring, whereas the movement of the mass body inside the housing during a later phase is counteracted by a reaction force, which is the sum of the forces from the first spring and the second spring.

5. Crash detector according to claim 1, characterized in that the housing comprises a cylinder and the mass body is a ball which is freely movable inside the cylinder against the action of the first spring, and in that the ball, in its normal retracted position, is located at a predetermined distance from the actuator.

6. Crash detector according to claim 5, characterized in that the distance for the ball to move inside the cylinder is at least equal to the distance between the point of the pin and the actuator.

7. Crash detector according to claim 3, characterized in that the pin is axially movably mounted in a sleeve at the actuator end of the housing, and in that the head of the pin is located inside the housing, a collar of the pin being provided outside the housing, and in that the second spring acts between the actuator end of the housing and the pin head to force the pin into the housing, whereby the collar thereof engages the outer surface of the actuator end.

8. Crash detector according to claim 1, characterized in that the actuator is located at a predetermined distance from the point of the firing pin so that the said pin may move a relatively small distance in relation to the housing without providing actuation of the actuator.

9. Crash detector according to claim 1, characterized in that the actuator is associated with a means for instantaneously providing an extra tightening of safety belts, an inflation of crash damping cushions, a release of fire extinguisher or the like.

10. Crash detector according to claim 1, characterized in that the second spring comprises a plate spring formed as a snap spring which at the center thereof carries said firing pin and which normally keeps the firing pin in a retracted snap position, but which, at a predetermined actuation by the mass body, is made to snap over to a projected forward snap position.

11. Crash detector according to claim 10, characterized in that the front end of said first spring engages the snap spring.

12. Crash detector according to claim 10, characterized in that the housing comprises a closed cylinder which at the front end thereof supports a carrier in which the actuator is mounted so that the crash detector and the actuator form an integral unit.

13. Crash detector according to claim 12, characterized in that the actuator is a detonator which is mounted in a through bore in a carrier in front of the firing pin and at such distance from the point of the firing pin that the detonator is actuated by the firing pin when the snap spring snaps over to its projected snap position.

* * * * *